Figure 1:
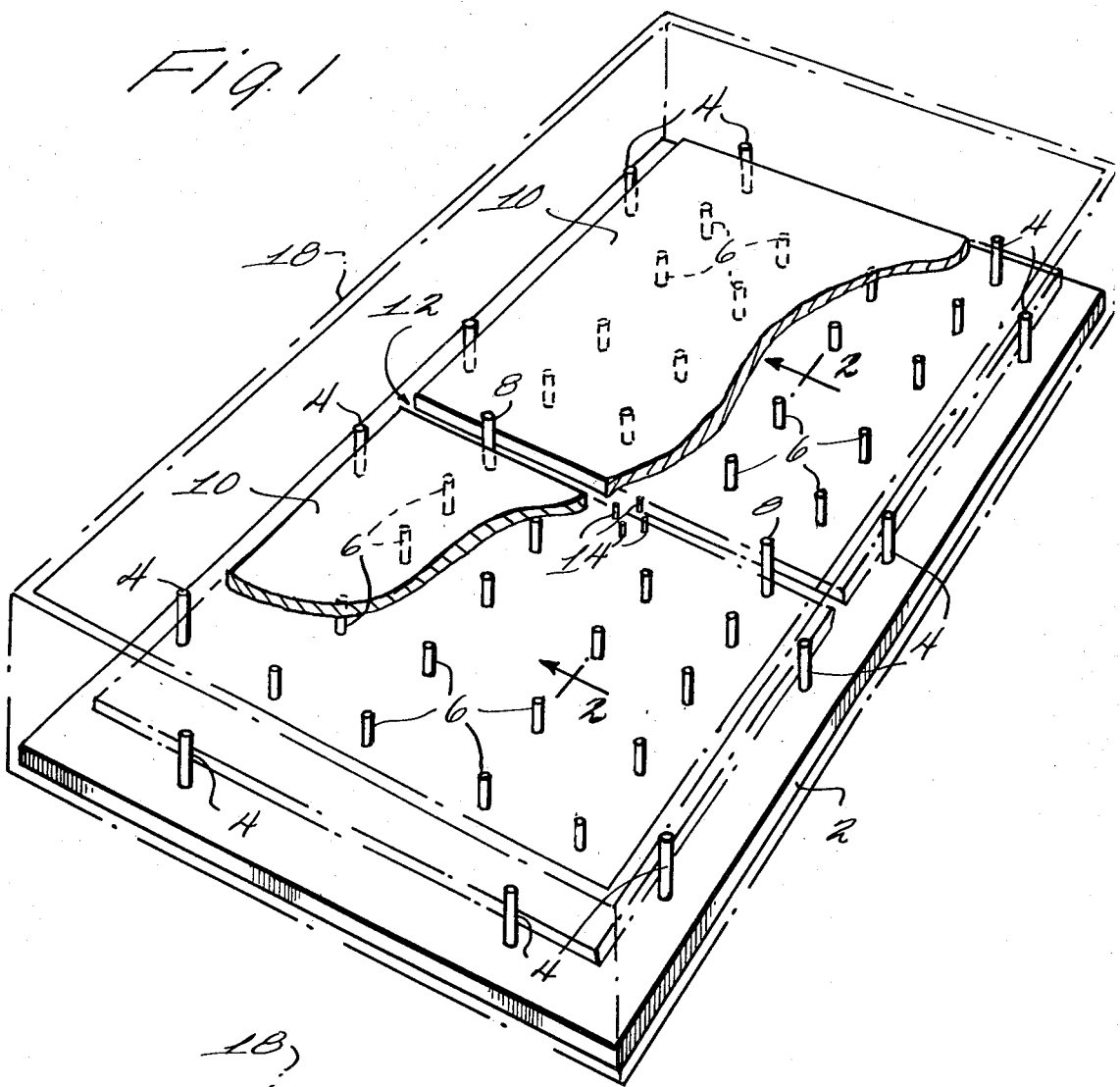

United States Patent
Cochran, II

[15] 3,685,343
[45] Aug. 22, 1972

[54] APPARATUS FOR DETERMINING FLAMMABILITY

[72] Inventor: William H. Cochran, II, P.O. Box 32, Stonington, Conn. 06378

[22] Filed: April 28, 1970

[21] Appl. No.: 32,548

[52] U.S. Cl. .................................................73/15 R
[51] Int. Cl. ...........................................G01n 25/00
[58] Field of Search..........................................73/15

[56] References Cited

UNITED STATES PATENTS

| | | |
|---|---|---|
| 2,895,327 | 7/1959 | Monego et al.................73/15 |
| 2,391,161 | 12/1945 | Hubert..........................73/15 |
| 3,088,309 | 5/1963 | White, Jr. et al. .............73/15 |
| 3,148,531 | 9/1964 | Stoll et al.......................73/15 |

Primary Examiner—Richard C. Queisser
Assistant Examiner—Herbert Goldstein
Attorney—Cushman, Darby & Cushman

[57] ABSTRACT

Apparatus for determining flammability of fabrics or other materials. The apparatus comprises a baseplate, means fixed to the baseplate for positioning and supporting a plurality of specimens above the baseplate in a spaced relationship such as to provide a gap between the specimens extending transversely of the baseplate and means for holding specimen igniting means on the baseplate beneath the specimens and in alignment with the transverse gap.

3 Claims, 2 Drawing Figures

PATENTED AUG 22 1972 3,685,343

INVENTOR
WILLIAM H. COCHRAN II

BY Cushman, Darby & Cushman
ATTORNEYS

APPARATUS FOR DETERMINING FLAMMABILITY

The present invention is concerned with a novel and highly practical apparatus for determining the flammability of fabrics and other materials.

There is a real need in the textile art for a meaningful and practical fabric flammability test apparatus. Conventional test procedures suffer from various disadvantages. For example, the well-known tunnel test is time consuming and costly and requires a larger piece of test fabric than laboratory scale while the pill test, which is also used extensively, is inadequately severe and, consequently, does not simulate an adequately broad range of common fire hazards.

The principal object of the present invention is to provide a fabric flammability test apparatus which obviates prior art disadvantages. A more particular object is to provide a test method which is inexpensive and relatively quick and yet gives meaningful and understandable flammability data. Other objects will also be hereinafter apparent.

Broadly speaking, the present invention involves providing a specimen supporting member comprising a base with pins or the like on the base for positioning and supporting at least one specimen a short distance above the base and in a plane parallel thereto, optionally enclosing the thus supported and positioned specimen within a box-like member which is open at the top but closed at the sides, igniting a flame and/or heat source, e.g. a timed burning tablet, such as methenamine or the equivalent positioned below the specimen so that the specimen is directly exposed to the ignited flame and/or heat source and measuring the amount of burning of the specimen after flame and smoke are no longer evident. Preferably a pair of specimens is tested together by appropriately spacing the same above the base in a common plane so as to leave a gap with the ignited flame and/or heat source positioned directly below the gap.

Figure 2:
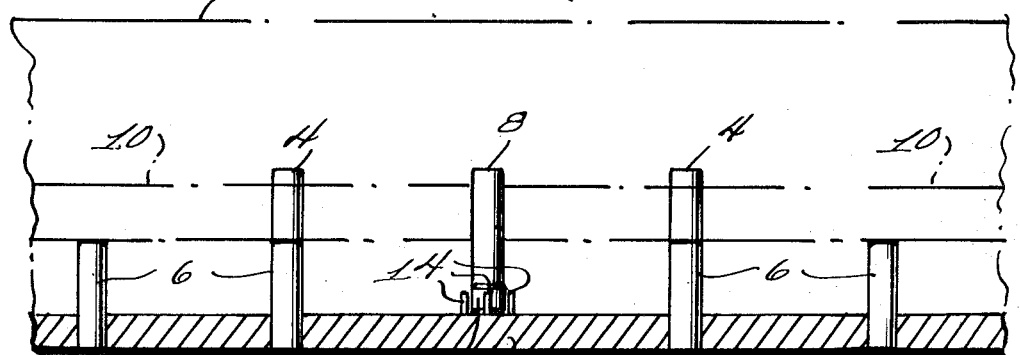

An embodiment of the invention is further described by reference to the accompanying drawings wherein:

FIG. 1 is a perspective view of one form of apparatus according to the invention; and FIG. 2 is a vertical section on the line 2—2 of FIG. 1 showing two fabric specimens in position for testing;

Referring more specifically to FIGS. 1 and 2, the apparatus comprises a baseplate 2 which advantageously is composed of steel or other heat resistant material. The plate may be of any convenient thickness, e.g. one-fourth inch, and its length and width may be widely varied provided these dimensions are large enough to position and support one or more fabric specimens of the desired size.

Appropriately fixed in the baseplate 2 are a series of pins 4 of steel or the equivalent which extend essentially around the outer margin or periphery of the baseplate. These pins 4 serve to position the fabric specimens.

The baseplate 2 is also provided with a series of pins 6 of steel or the like which are of shorter height than pins 4 and serve to support the fabric specimens above the surface of the baseplate 2 as shown in FIG. 2. Typically pins 4 may be an inch or so high while pins 6 may be about one half the height of pins 4.

The baseplate 2 is also provided with pins 8, which are generally like pins 4 but are spaced across the plate at about the middle thereof. These pins 8 also serve to position the fabric specimens. As shown in FIG. 1, pins 8 separate the two fabric specimens 10 so as to provide a gap 12 therebetween. It will be appreciated from the drawings that the fabric specimens 10 are simply laid onto the specimen supporting pins 6 between the peripheral positioning pins 4 and against the pins 8, leaving the gap 12 between the specimens and extending transversely across the baseplate 2 as shown in FIG. 1.

Suitable pins 14 or other positioning means are also provided on the baseplate 2 to hold a timed burning tablet 16, e.g. a methenamine tablet or the like. The tablet is advantageously positioned in the middle of the baseplate 2 midway between the pins 8 and in alignment therewith so as to be directly beneath the gap 12 when the fabric specimens 10 are in position for testing.

When two specimens of fabric are to be tested, the specimens are cut to fit into the area defined by the pins 4 and 8 and then laid in position on the pins 6, the timed burning tablet 16 or other flame or heat source having previously been placed in position between the holding pins 14. Preferably, the test system described above is surrounded by an open-topped box, as shown in the drawings by broken lines and represented by the numeral 18. The box may be of any suitable height and material, e.g. metal or wood, the box being adapted to fit closely around the baseplate 2 so as to protect against external convection or other factors which might lead to variation in test results.

The tablet 16 or other heat source is then ignited and the degree of burning, i.e. flammability of the fabric, determined. This can be done in several ways. For example, the time interval between ignition and the time when flame and smoke are no longer evident may be measured. Additionally, or as an alternative, the weight of the fabric specimens, before and after burning, may be determined as a measure of the degree of flammability; and/or the distance or area of burning may be assessed such as by placing a mesh screen over the fabric specimens and counting the number of openings through which burning is evident.

A preferred method for testing pile fabric, e.g. carpet, using the above described apparatus is outlined below:

1. Cut two 6.72–6.76 inch squares from the fabric to be tested. Each cut should be perpendicular to the plane of the base and should be through the entire depth of the fabric to be tested. Two sides of the square should be parallel to the machine direction (or warp). Grams and inches are the normal units of measure in laboratories, while ounces and square yards are the normal units of measure in carpet and upholstery mills and markets. Since, approximately, 1 gram is to 1 ounce as 6.75 inches square is to 1 yard, weights in grams of 6.75 inch squares are the approximate equivalent of ounces per square yard. This obviates the necessity to compute when converting from laboratory units of measure to mill/market units of measure.

2. Dry both squares for one hour in a circulating-air oven at 250°–260° F.

3. On removal from the oven, weigh both squares and record their respective weights.

4. Place baseplate 2 on a horizontal surface, level it and clean it so that metal is free of foreign matter. Baseplate 2 and the air temperature where the test is run should be at 65°–80° F.

5. Place one methenamine reagent tablet No. 1588 (Eli Lilly and Company) between locating pins (14) resting on baseplate 2 with either end of its cylindrical shape down.

6. Within 2 minutes of removal from the oven, place one square of the fabric being tested between spacing pins 4 on one side of the baseplate 2 and the other square between spacing pins 4, on the other side of the plate, each with its pile side away from baseplate 2 and with its machine direction (or warp) parallel to the longer side of baseplate 2. Both squares should be in contact with spacing pins 8 and resting on their respective support pins 6.

7. Place box 18 around baseplate 2. As noted, the purpose of the box is to minimize variations in test results caused by external convection. If, when the box is in place, there is visual evidence of convection originating from other than within the box affecting the flame from the methenamine tablet, the test should be repeated at a site where no external convection effects are detectable.

8. Ignite the methenamine tablet and, simultaneously, record the time of ignition.

9. When flame and/or smoke are/is no longer evident, record time and compute elapsed time for each square. Average the two values obtained.

10. Weigh each square within two minutes of the completion of step 9. Compute the percentage of weight lost for each square. Average the two values obtained.

11. Lay 4-mesh screen over the pile side of each square. Count the number of ¼" × ¼" openings through which evidence of burning is apparent 4. Compute percentage of area burned (divide the number counted by 729, multiply quotient by 100). Average the two values obtained.

12. Lay 4-mesh screen over the back side of each square. Count the number of ¼" × ¼" openings through which any evidence of burning is apparent 4. Compute percentage of area burned (divide the number counted by 729, multiply quotient by 100). Average the two values obtained.

13. The values obtained from any or all of steps 9, 10, 11 and 12, may be reported. If any result obtained from any one square varies more than 10 percent from the counterpart result from the other square according to steps 9 and 10 the results should be discarded and the test repeated. If any result obtained from any one square varies more than sixty 60 ¼" × ¼" units from the counterpart result from the other square according to steps 11 and 12 the results should be discarded and the test repeated.

As will be evident, the present invention provides a simple and effective way for determining flammability of fabrics. The method contemplated requires only a relatively short period of time and is inexpensive compared to other known types of tests, e.g. the tunnel test. While the invention has been described above with particular reference to pile fabric, e.g. carpets or scatter rugs, it will be appreciated that all types of fabric and other materials may be tested with present method and apparatus.

Obviously, various other modifications may be made in the invention as described. For example, external means may be included to provide for induced convection, over and above that caused by the flame and/or heat source and the burning of the test specimen, so as to give particularly severe test conditions. Metals or other heat reflecting materials are particularly advantageous for the baseplate, pins and box to simulate common burning conditions.

Accordingly, the scope of the invention is defined in the following claims wherein:

What is claimed is:

1. Apparatus for determining flammability comprising a baseplate, means fixed to the baseplate for positioning and supporting a plurality of specimens above said baseplate in a spaced relationship such as to provide a gap between said specimens extending transversely of said baseplate and means for holding specimen igniting means on the baseplate beneath said specimens and in alignment with said transverse gap substantially midway between the specimens.

2. Apparatus comprising a baseplate, specimen positioning means on the baseplate and located near the periphery thereof, further specimen positioning means located transversely across the baseplate near the center thereof, spaced specimen supporting means on the baseplate of shorter height than the specimen positioning means, whereby a pair of specimens may be supported on said supporting means while being held in position by said positioning means with a transverse gap between said specimens defined by the further specimen positioning means which extend transversely across the baseplate, and means for holding specimen igniting means on the baseplate beneath said specimens and in alignment with said transverse gap.

3. The apparatus of claim 2 wherein said positioning means and said supporting means both comprise a series of pins.

* * * * *